United States Patent
Winkler et al.

(10) Patent No.: US 12,084,015 B2
(45) Date of Patent: Sep. 10, 2024

(54) ELECTRICAL WHEEL BRAKE ACTUATOR WITH IMPROVED END POSITION RECOGNITION

(71) Applicant: Continental Teves AG & Co OhG, Frankfurt am Main (DE)

(72) Inventors: Thomas Winkler, Frankfurt am Main (DE); Jürgen Balz, Frankfurt am Main (DE)

(73) Assignee: Continental Teves AG & Co OhG, Frankfurt am Main (DE)

( * ) Notice: Subject to any disclaimer, the term of this patent is extended or adjusted under 35 U.S.C. 154(b) by 598 days.

(21) Appl. No.: 17/280,428

(22) PCT Filed: Sep. 25, 2019

(86) PCT No.: PCT/EP2019/075814
§ 371 (c)(1),
(2) Date: Mar. 26, 2021

(87) PCT Pub. No.: WO2020/064805
PCT Pub. Date: Apr. 2, 2020

(65) Prior Publication Data
US 2021/0380091 A1     Dec. 9, 2021

(30) Foreign Application Priority Data
Sep. 26, 2018  (DE) .................... 10 2018 216 509.2

(51) Int. Cl.
*B60T 13/74*     (2006.01)
*B60T 1/06*      (2006.01)
(Continued)

(52) U.S. Cl.
CPC ............ *B60T 13/741* (2013.01); *B60T 1/067* (2013.01); *B60T 13/746* (2013.01); *F16D 51/22* (2013.01);
(Continued)

(58) Field of Classification Search
CPC ...... B60T 13/741; B60T 13/746; B60T 1/067; F16D 65/22; F16D 51/22; F16D 2066/003
See application file for complete search history.

(56) References Cited

U.S. PATENT DOCUMENTS

| | | | | |
|---|---|---|---|---|
| 4,470,033 A | * | 9/1984 | Hofsass | H01H 37/5427 337/365 |
| 5,628,389 A | * | 5/1997 | Wittmann | F16D 13/757 192/89.25 |

(Continued)

FOREIGN PATENT DOCUMENTS

| | | | | |
|---|---|---|---|---|
| CN | 101517261 A | | 8/2009 | |
| CN | 103591173 A | * | 2/2014 | F16D 13/64 |

(Continued)

OTHER PUBLICATIONS

Chinese Notice of Allowance for Chinese Application No. 201980049856.9, dated May 9, 2023 with translation, 5 pages.
(Continued)

*Primary Examiner* — Vishal R Sahni
(74) *Attorney, Agent, or Firm* — Buchanan Ingersoll & Rooney PC (57) ABSTRACT

An electrical wheel brake actuator for motor vehicles, designed to move a brake pad in the direction of a brake rotor and having an electric motor-gear assembly with a rotation-translation converter assembly that includes a nut-spindle arrangement, and an elastic element which is associated with a release end stop of the spindle arrangement in order, together with a control unit, to allow the electric motor to be automatically electrically switched off. The elastic element includes at least two disc springs which are able to form an expanded segmented force-travel spring curve formed from multiple force-travel spring curve portions.

12 Claims, 4 Drawing Sheets

(51) Int. Cl.
*F16D 51/22* (2006.01)
*F16D 65/22* (2006.01)
*F16D 66/00* (2006.01)
*F16D 121/24* (2012.01)
*F16D 125/40* (2012.01)
*F16D 125/62* (2012.01)
*F16D 127/02* (2012.01)

(52) U.S. Cl.
CPC ........ *F16D 65/22* (2013.01); *F16D 2066/003* (2013.01); *F16D 2066/006* (2013.01); *F16D 2121/24* (2013.01); *F16D 2125/40* (2013.01); *F16D 2125/62* (2013.01); *F16D 2127/02* (2013.01)

(56) References Cited

U.S. PATENT DOCUMENTS

| | | | | |
|---|---|---|---|---|
| 5,720,683 | A * | 2/1998 | Patton | F16H 7/0848 474/138 |
| 6,105,988 | A * | 8/2000 | Turner | F16F 9/466 188/319.1 |
| 8,091,689 | B2 | 1/2012 | Tristano et al. | |
| 8,616,348 | B2 | 12/2013 | Winkler et al. | |
| 8,925,692 | B2 | 1/2015 | Funke et al. | |
| 9,175,737 | B2 | 11/2015 | Bach et al. | |
| 10,207,882 | B2 | 2/2019 | Kitsuki et al. | |
| 10,208,844 | B2 | 2/2019 | Ritter et al. | |
| 10,654,460 | B2 | 5/2020 | Winkler et al. | |
| 2010/0163351 | A1 | 7/2010 | Sakashita et al. | |
| 2016/0102720 | A1* | 4/2016 | Bach | F16D 65/22 188/327 |
| 2018/0345937 | A1 | 12/2018 | Winkler et al. | |

FOREIGN PATENT DOCUMENTS

| | | | | |
|---|---|---|---|---|
| CN | 104196922 | A | 12/2014 | |
| CN | 108430844 | A | 8/2018 | |
| CN | 108473126 | A | 8/2018 | |
| DE | 2016050 | A1 | 2/1971 | |
| DE | 19826785 | A1 | 12/1999 | |
| DE | 102009038138 | A1 | 12/2010 | |
| DE | 19881886 | B4 * | 3/2014 | F16D 13/71 |
| DE | 102012110505 | A1 | 5/2014 | |
| DE | 102014203198 | A1 * | 8/2014 | F16D 13/585 |
| DE | 102013210528 | A1 * | 12/2014 | B60T 7/085 |
| DE | 102014202027 | A1 * | 8/2015 | F16D 13/585 |
| DE | 102016209794 | A1 * | 6/2017 | |
| EP | 1426645 | A1 | 6/2004 | |
| EP | 1659305 | A1 * | 5/2006 | F16D 13/583 |
| JP | 05118363 | A | 5/1993 | |
| JP | 08310377 | A | 11/1996 | |
| JP | 2009012576 | A | 1/2009 | |
| JP | 2010090994 | A | 4/2010 | |
| JP | 2016007968 | A | 1/2016 | |
| JP | 2018058530 | A | 4/2018 | |
| JP | 2018100174 | A | 6/2018 | |
| JP | 2018100714 | A | 6/2018 | |
| WO | 2007039292 | A1 | 4/2007 | |
| WO | 2009030726 | A1 | 3/2009 | |
| WO | 2012104395 | A2 | 8/2012 | |
| WO | 2014195329 | A1 | 12/2014 | |

OTHER PUBLICATIONS

International Search Report and Written Opinion for International Application No. PCT/EP2019/075814, dated Feb. 19, 2020, 8 pages.
German Examination Report for German Application No. 10 2018 216 509.2, dated Oct. 9, 2019, 5 pages.
Häussermann, "Die Physik der Tellerfeder und Wellfeder", 2016, downloaded at http://haussermann.com/files/pub/tellerfeder.pdf., with translation, 40 pages.
Brazilian Office Action for Brazilian Application No. 112021005390-5, dated Aug. 23, 2023 with partial translation, 8 pages.
Japanese Decision to Grant a Patent for Japanese Application No. 2021-516967, dated Dec. 9, 2022 with translation, 4 pages.
Korean Notice to Submit a Response for Korean Application No. 10-2021-7012121, dated Oct. 27, 2022 with translation, 12 pages.
Chinese Office Action for Chinese Application No. 201980049856.9, dated Aug. 11, 2022, with translation, 14 pages.

* cited by examiner

ELECTRICAL WHEEL BRAKE ACTUATOR WITH IMPROVED END POSITION RECOGNITION

CROSS REFERENCE TO RELATED APPLICATIONS

This application is the U.S. National Phase Application of PCT International Application No. PCT/EP2019/075814, filed Sep. 25, 2019, which claims priority to German Patent Application No. 10 2018 216 509.2, filed Sep. 26, 2018, the contents of such applications being incorporated by reference herein.

FIELD OF THE INVENTION

The present invention concerns an electric cable-pull actuator 3 as may be used in particular for a drum brake module 1 which is actuated by an electric motor. This may in particular include an electromechanical cable-pull brake actuator 3 with gear housing 8, the gear housing sump of which with a cable-pull outlet on the wheel brake side is arranged on an outside 12 of a brake holder 2 or brake carrier, and comprises a rotation-translation converter which as a result of a rotational drive motion generates a translational actuating motion (B) of brake means 6a,b that are arranged on an inside 13 of the brake holder 2 facing away from the cable-pull actuator 3 in the interior of a brake rotor, so that said means may execute an actuating movement in the direction towards the brake rotor.

BACKGROUND OF THE INVENTION

To interrupt or terminate the energizing of an actuator, it is known to detect the end position by current monitoring. This is a necessity for a correct internal transfer of the vehicle status, or a compatibility requirement in conjunction in particular with robot-supported, communicatively linked and/or otherwise digitally controlled added value functions. Because an automated parking brake function must be ensured, the same criteria apply. However, the rotor and drive-gear train of these wheel brake actuators are subject to friction and inertia. The system must also function reliably under very difficult ambient conditions. The unbraked travel of an actuator into a release end stop position is often perceived as uncomfortable by customers. Therefore, an early, sufficiently sensitive, economic and reliable recognition of reaching a release end position is always an important peripheral condition for safe and comfortable operation of electrical wheel brake actuators. WO 2014/195329 A1, incorporated herein by reference, therefore discloses a basically generic cable-pull drum brake actuator 3, wherein a drive nut 14 is supported on a brake holder 2 by means of a roller bearing 15 so as to be axially fixed and rotatable from the outside. Said bearing 15 also permits a radially centered mounting, protected against tilt moments, for the drive nut 14. The spindle arrangement 9 is in engagement with the drive nut 14, and is positioned so as to be guided in rotationally fixed and axially displaceable fashion in the gear housing 8. To permit an expedient electrical deactivation of the cable-pull actuator 3 by means of an electrical recognition of the release end stop, the spindle arrangement 9 is equipped with a release end stop 20 which serves to abut against a housing-side counterbearing 21. Furthermore, at least one elastic element 22 is provided between counterbearing 21 and release end stop 20. The elastic element 22 is configured as a compact disc spring arrangement. This in principle allows an electronic control unit, in conjunction with the measurement and monitoring of the power requirement of the motor 7, to switch off the power in a favorable and promptly agile, electrically initiated fashion. The previously known design of a spring element appears worthy of refinement.

SUMMARY OF THE INVENTION

An aspect of the present invention allows an improved end position recognition with simpler production while avoiding the disadvantages of the prior art.

An aspect of the invention achieves, in a particularly innovative fashion, firstly in that the elastic element 22 is composed of at least two disc springs in order to form an expanded, segmented force-travel spring curve composed of multiple spring curve portions. The modular assembly with alternating segments allows particularly suitable adaptation of the spring curve to the requirements of the respective actuator application, so that according to an aspect of the invention, for the first time a significantly simplified large-series variation, including non-linear curve spread, is possible. Accordingly, the respective electronic control unit ECU may have a particularly robustly designed electrical end stop recognition as part of a motor current monitoring. A positive feature here is also the particularly compact and suitable integration of the elastic element in the vicinity of the rotation-translation converter. An assembly of three or more disc springs is possible in special cases.

Advantageously, a force-travel curve, composed according to an aspect of the invention, of a modularly assembled elastic element comprises at least one degressively curved spring curve portion A-B and connected thereto a progressively curved spring curve portion C-D. Accordingly, initially a comparatively softly, i.e. gently damped run-in to the end stop is possible which offers sufficient opportunity for terminating the power shutdown, and wherein the gear train, which continues to run gradually due to inertia to a certain extent, can then be safely braked at latest in the progressive force-travel curve portion in order to reliably avoid a hard end stop.

The robustness of control of the system is furthermore increased in a targeted fashion in that the force-travel spring curve of the modularly assembled elastic element also has at least one spring curve portion B-C which is oriented substantially horizontally. In the context of this embodiment, the horizontally oriented spring curve portion B-C is inserted between the degressively curved spring curve portion A-B and the progressively curved spring curve portion C-D.

A structurally preferred exemplary embodiment with a moderate number of components also offers the advantages of identical parts strategy, and provides that the elastic element is present as a layered disc spring column which includes at least one individual disc spring in combination with a disc spring packet arranged alternately relative to the individual disc spring, and wherein this disc spring packet comprises at least two superposed disc springs facing in the same direction. The disc spring packet may have two identically formed disc springs with degressive spring curve, wherein the block force of the disc spring packet is designed smaller than the block force of the elastic element. Furthermore, the preferred embodiment provides that the individual disc spring has a linear or progressive force-travel spring curve, wherein the block force of the individual disc spring corresponds to the block force of the elastic element (22). In other words, the individual disc spring is deliberately dimensioned as a gear brake such that this effectively engages secondarily, after the upstream disc spring packet has already deformed to block length. As a variation, it is possible that the disc spring packet has two identically formed disc springs with linear or progressive force-travel spring curve. In this alternative configuration, the block force of the disc spring packet corresponds to the block force of the elastic element. In contrast, the individual disc spring may have a degressive or linear force-travel spring curve with reduced block force. The force-travel spring curve may also have a gradient reversal point G and various part portions of constant or linear gradient. For rationalisation, it is recommended that all disc springs be made of the same sheet steel material.

BRIEF DESCRIPTION OF THE DRAWINGS

In the drawing, in part schematically and/or on different scales or in different sections, views or perspectives, in accordance with the figure description.

DETAILED DESCRIPTION OF THE PREFERRED EMBODIMENTS

Figure 1:
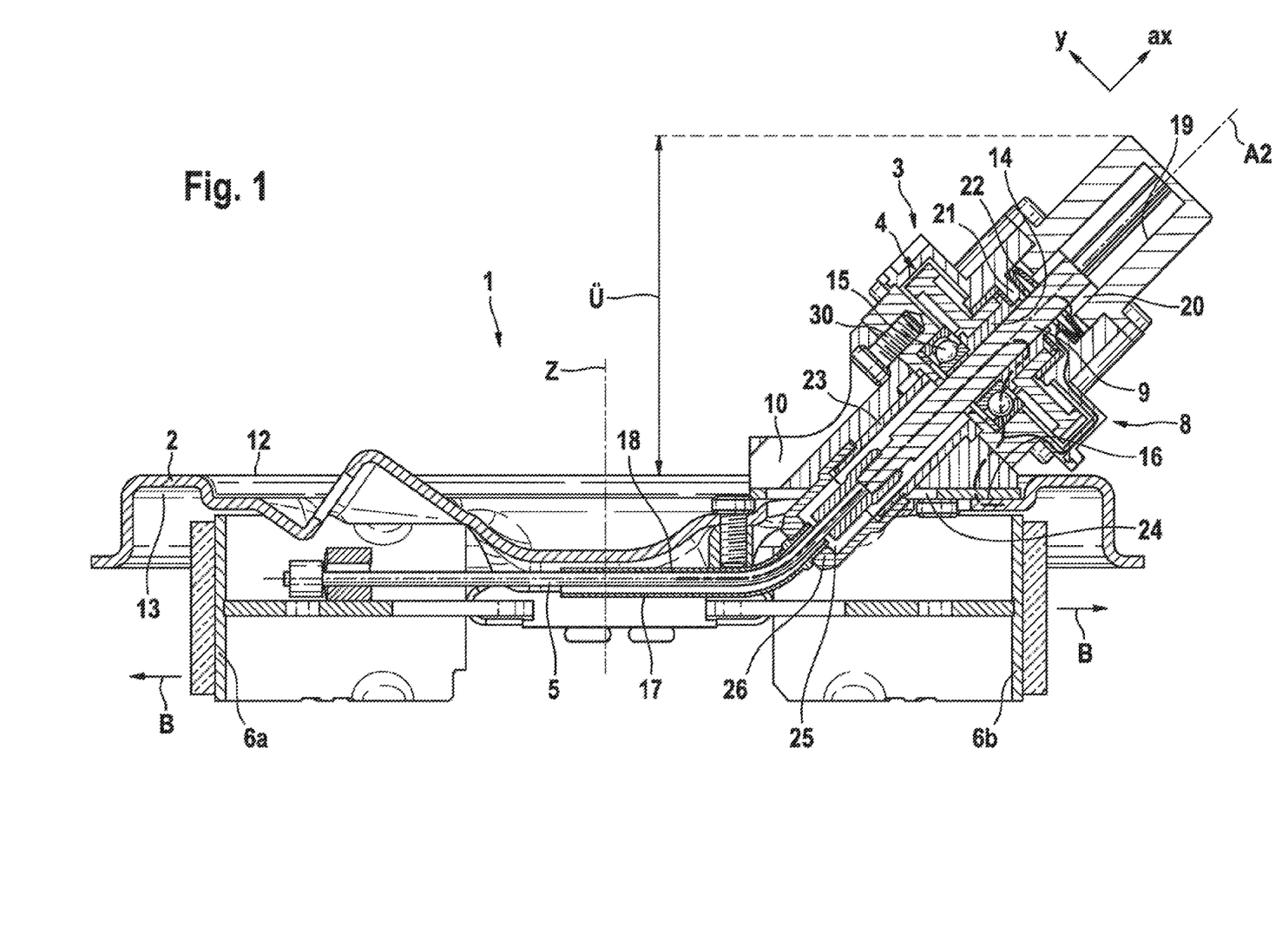
FIG. 1 shows the previously published drum brake module comprising a previously known nut-spindle bearing in a gear housing according to WO 2014/1195329 A1, incorporated herein by reference, solely for explanation.

A known drum brake module 1, actuatable by electric motor, for arrangement on axle components of a motor vehicle comprises, as per FIG. 1, a brake holder 2 on which brake means 6a,b are mounted in cooperation with a brake rotor (not shown). On an opposite side of the brake holder 2, there is fastened a cable-pull actuator 3 which is driven by electric motor and which, via a gearing 4 and a downstream cable-pull 5, engages on one or more brake means 6a,b such that said brake means 6a,b can perform an actuation movement B in the direction of the brake rotor, in order to execute a service and/or parking brake function. A support device 11 may be provided between the brake means 6a,b.

The gearing 4 comprises a gear housing 8 which receives or at least supports the motor 7. The motor 7 consumes direct-current voltage, is mechanically or electronically commutated, and is of an inexpensively available standard type.

FIG. 1, in any case indirectly, illustrates that an axis A1 of the motor 7 is arranged at a distance x from and parallel to an axis A2 of a spindle arrangement 9. The adapter 10 is inserted between the cable-pull actuator 3 and the brake holder 2.

The drive and gear train has a multistage, in particular 2-stage gearing with gearwheel and/or belt, and/or a worm gear and/or planetary gear mechanism (mixed combinations of the above types are possible and desirable) as a step-down torque converter. Here, a preferably two-stage multiwheel gear mechanism permits a reduction ratio in a range between approximately 7:1 and 25:1. If the downstream lever mechanism in the region of the brake means 6a,b permits a gear reduction of approximately 5:1, a reduction ratio of approximately 125:1 is achieved. There is furthermore also an additional reduction effect of the rotation-translation converter, which permits an overall gear reduction effect across the entire drive train of an order of magnitude of at least approximately 250:1. By means of this gear train, the cost and power demands on the motor 7 are additionally considerably lowered.

Details of the cable-pull actuator construction are evident from FIG. 1. The cable-pull actuator 3 is in this case provided as a separately handleable structural unit on a side 12 of the brake holder 2. It is possible for the rotation-translation converter to be integrated as a spindle arrangement 9 into the gear housing 8 and to be guided in the gear housing 8 in a rotationally fixed, free-moving and play-free fashion. A modification of the design provides that the rotation-translation converter is arranged outside the gear housing 8 inside the brake rotor, and includes a spindle arrangement 9 or a pivotable lever mounted on the brake holder 2. The fixing is preferably a releasable flange fixing.

As partially evident from FIG. 1, the gear housing 8 is made from multiple parts. The gear housing 8 accommodates a multiplicity of gearing components which serve primarily for torque conversion (low input torque, high output torque), and which can also permit an electrically deenergized parking brake function by means of self-locking. Axes A1, A2 of motor and gear shafts are provided so as to be parallel to one another, offset by the spacing X. At least certain gearing structural elements may at least partially comprise inexpensive plastics material. Electrically deenergized self-locking is preferably provided in the rotation-translation converter (spindle arrangement 9), such that the rest of the gear train is, in principle, substantially relieved of the brake application forces.

As per FIG. 1, the gear housing 8 at least partially additionally accommodates a rotation-translation converter assembly with the spindle arrangement 9 for converting the rotational drive movement into a translational output movement. Consequently, for a compact integration into the known drum brake arrangements, the converter is inserted in inexpensive and space-saving (compact) fashion in an interface between cable-pull actuator 3 and brake holder 2, and is nevertheless guided in the gear housing such that, for a conversion to the electromechanical cable-pull actuator arrangement, no changes whatsoever are required to the drum brake mechanism, in particular to the lever mechanism or to the brake holder 2.

For applications with a particularly effective electromechanical braking function with reduced friction, several roller bodies are situated between a drive nut 14 formed in principle of metal and a spindle arrangement 9 formed in principle of metal. In "normally released" variants, a parking brake function is enabled by a separate fixing, locking or blocking device. A particularly advantageous device is known for example from DE 19826785 A1, the disclosure of which with respect to the principles of this parking device is incorporated herein by reference.

The force flow of the brake actuating force is as follows. Proceeding from brake means 6a,b and cable-pull 5, the tension force passes via spindle arrangement 9 into the drive nut 14. A metallic spacer may ensure direct and rigid support of the brake force on a flat contact face 16. This supports an outer ring of the bearing 15 on the brake holder 2. The spacer is preferably formed as an insert in the gear housing 8 of plastic material. The bearing 15 is advantageously designed as a low-friction rolling bearing (angular-contact bearing, shoulder bearing, axial bearing or deep-groove ball bearing).

The described bearing 15 also permits a radially directed mounting for the drive nut 14. In a modification of the design, for particularly precise, tilt-resistant support of the drive nut 14, in each case one drive-side and additionally one output-side bearing may be provided without departing from the invention.

The spindle arrangement 9 is in engagement with the drive nut 14, and is positioned so as to be guided in the gear housing 8 in rotationally fixed and axially displaceable fashion. For this purpose, the gear housing 8 has a prismatic or cylindrical guide 19 with at least one or more adapted sliding-block elements which, as means with a positively locking action, contribute to the guidance and rotational fixing function. To permit an expedient electrical deactivation of the cable-pull actuator 3, the spindle arrangement 9 is equipped with a release end stop 20 which serves for abutment against a housing-side counterbearing 21. Furthermore, at least one elastic element 22 is provided between counterbearing 21 and release end stop 20. The elastic element 22 is preferably formed as a disc spring arrangement, which makes it possible to realize a firm spring curve with a small space requirement. This, in conjunction with measurement and observation of the electrical current demand of the motor 7, permits an expedient and early automatic electrical deactivation by means of the control unit. In order to constantly allow reproducible shutdown, the system requires operating conditions (cable guide friction) which are as constant as possible.

The compact cable-pull actuator design includes that the spindle arrangement 9 is at least partially accommodated in displaceably guided fashion in a connector 23 of the gear housing 8. The connector 23 is centered relative to a passage opening 24 of the brake holder 2. The connector 23 preferably engages through the passage opening 24 such that at least a part of the spindle arrangement 9 can be displaced into the interior of the brake rotor. This also serves for automatic centering of the cable-pull 5.

Figure 3:
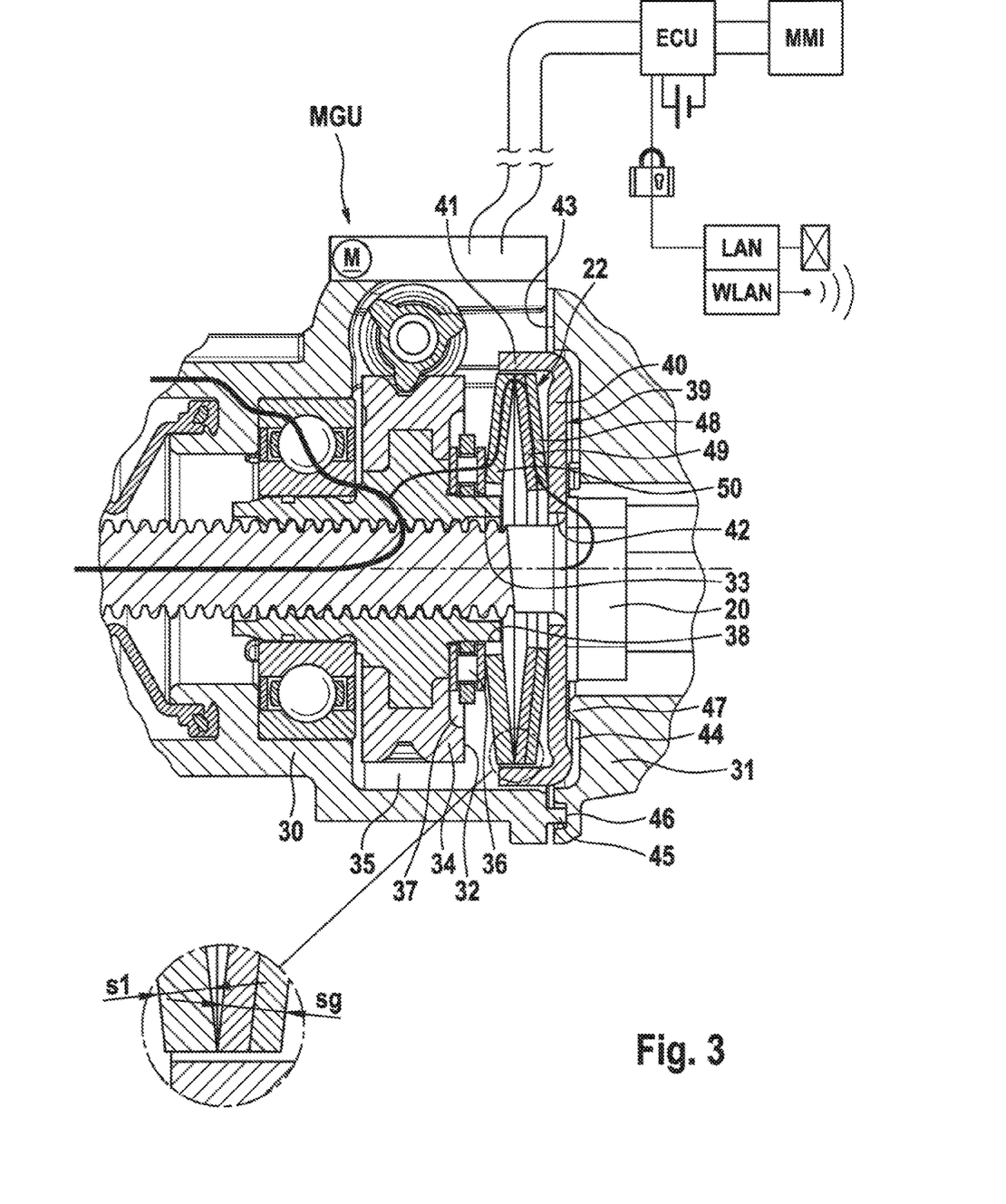
FIG. 3 shows in principle, in partially greatly enlarged cross-section, a preferred embodiment of an elastic element constructed according to the invention with expanded force-travel spring curve for improved resolution of end stop recognition.

On this basis, the features of an aspect of the present invention are described below with reference to a preferred exemplary embodiment as shown in FIG. 3, wherein the features of a force-travel spring curve for an exemplary embodiment arise from FIG. 4.

An electric motor-gear unit is generally integrated in a peripheral electrical on-board network architecture of the motor vehicle, such as a data ring bus, and has at least one assigned electronic control unit ECU (including secured external data network interface) and also at least one man-machine interface MMI (e.g. display, hardware switch and/or pedal set) for manual operation of the parking brake actuator (application; release).

Figure 2:
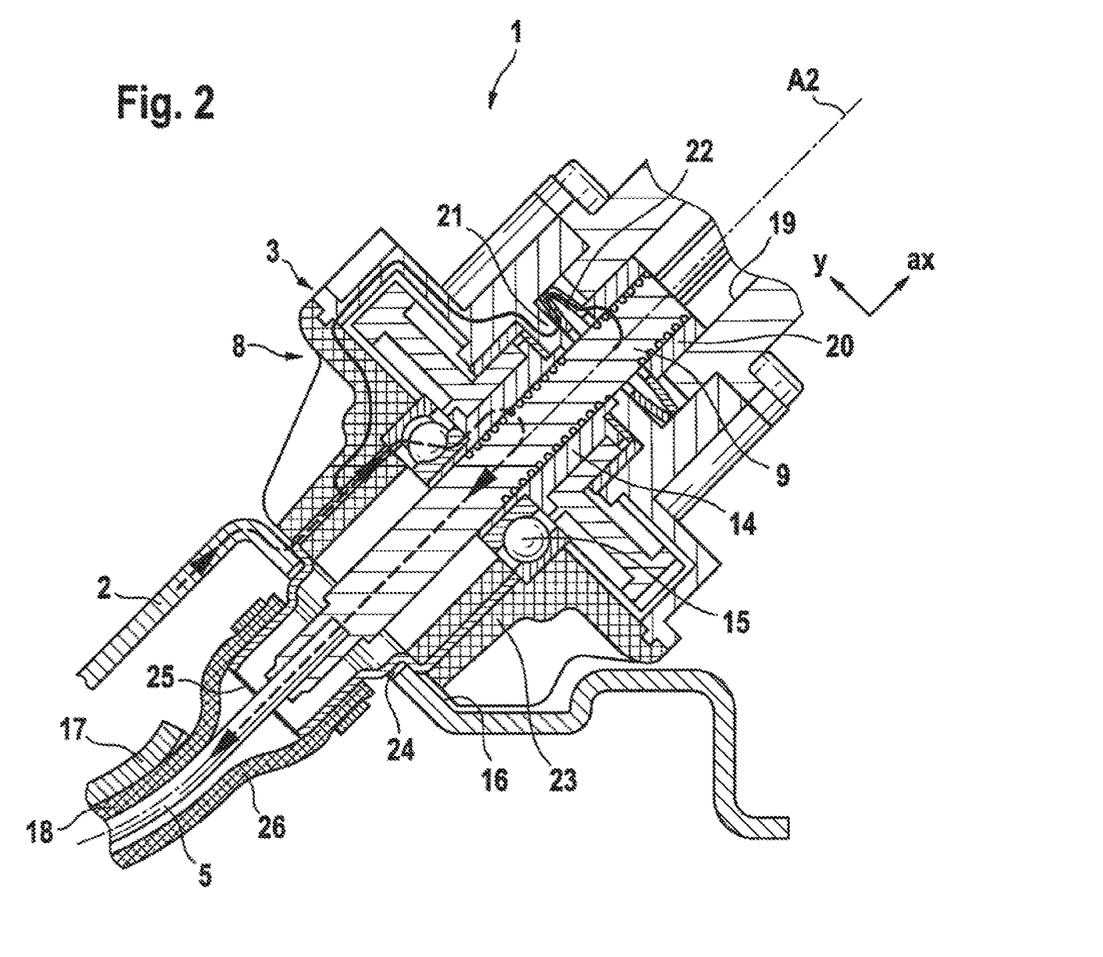
FIG. 2 shows an enlarged part of FIG. 1.

In comparison with known assemblies as shown in FIG. 1 and FIG. 2, the configuration is wholly novel with respect to the elastic element 22, wherein also there is no counterbearing 21 or gear housing intermediate part inserted in between. According to an aspect of the invention, a gear housing sump 30 and a gear housing cover 31 suffice.

The elastic element 22 is clamped laterally at the side next to the drive nut 14 between a flank 32 of the drive nut 14 and the release end stop 20 of the spindle arrangement 9. The drive nut 14 to a certain extent is configured as a composite component which in its centre has a hub 33 with nut thread, wherein the drive nut 14 is also in rotationally fixed connection with an externally toothed gear wheel 34 that meshes rotationally with the actuator gear train. This arrangement, with adjacent components arranged next to each other, allows a particularly compact configuration and common mounting because it enables the elastic element 22 to be received economically, together with the drive nut 14, recessed into a common depression 35 of the gear housing sump 30.

The elastic element 22 may be clamped directly between the spindle-side release end stop 20 and the drive nut 14. However, to avoid direct contact but with a corresponding increase in the number of components, it is also possible for the elastic element 22 to be clamped indirectly, i.e. with the interposition of at least one further component, between the release end stop 20 and the drive nut 14. An axial bearing 36, which itself is supported on the flank 32 of the drive nut 14, may be integrated in the force flow of this indirect support. A particularly compact design, in the sense of a further significantly shortened installation length, is achieved if the axial bearing 36 is received into a recess 37 arranged on a side front face, with integral bearing seat 38, in the hub 33 of the drive nut 14. On the other side, the elastic element 22 is supported indirectly, via a spring plate 39 made of cold-formed sheet steel, on the release end stop 20 of the spindle arrangement 9. In particular for the purpose of mutual installation-friendly centering, also with respect to the adjacent interfaces of peripheral components, it may be advantageous if the spring plate 39 is formed dish-shaped with a base 40, a wall 41 and a central bore 42 as a passage for the spindle arrangement 9, which is mounted in the gear casing 8 so as to be relatively displaceable axially translationally, but rotationally fixed. A suitable stable support is achieved by a drawn strain-hardened base 40 which is at least slightly impressed, in conjunction with a defined stop cam 47 on a front face 43 of the gear housing cover 31. In this context, for example a particularly compact design is achieved if the spring plate 39, for the purpose of compact integration, is mounted at least partially recessed into the end side relief 44 of the gear housing cover 31 so as to be received integrally. In particular if the elastic element 22 is composite and in some cases comprises elastomer material, or is formed from several individual components such as in particular disc springs 48, 49, 50 in layered fashion, it is advantageously suitable if this multipiece arrangement can be handled safely by being premounted on the spring plate 39. The elastic element 22 is encapsulated by the spring plate 39 in that the wall 41 of the spring plate 39 at least partially surrounds a periphery of the elastic element 22 on the radial outside. The spring plate 39 may have a mandrel-like central protrusion which at least partially passes through the elastic element 22 from the inside, effectively as protection against bending. In a further embodiment of the modular or preassembled concept, the elastic element 22 and/or axial bearing 36 and/or spring plate 39, in some cases together with the drive nut 14, form a mounting component of the spindle arrangement 9 such that these components, together with the threaded spindle, may form an arbitrarily interlinked assembly, wherein this assembly or these components may be inserted as a bundled interconnected mounting unit in the gear housing sump 30.

The actuator gear housing is in principle preassembled in two parts of plastic material. The housing arrangement provides that a division plane extends between the gear housing sump 30 and the gear housing cover 31 in the region of the drive nut 14 with elastic element 22, such that the gearing components and in particular the spindle arrangement 9, including cable-pull 5 and drive nut 14, can easily be inserted in the depression 35 of the gear housing sump 30, wherein after insertion of all components, the two gear housing parts 30, 31 are inseparably hermetically welded together. In this context, for a hermetically sealed labyrinth-like and generally robust design, the gear housing parts may have on the front face a frame-like moulded ring protrusion, wherein the front face of the gear housing sump 30 has an annular bead protrusion 45 which can be welded into an opposingly arranged annular groove depression 46 on the front face of the gear housing cover 31. To this end, ultrasound welding methods are particularly suitable which are used in the automotive industry with recyclable, carbon fibre-reinforced, thermally stabilized and injectable thermoplastic materials for the gear housing.

Figure 4:
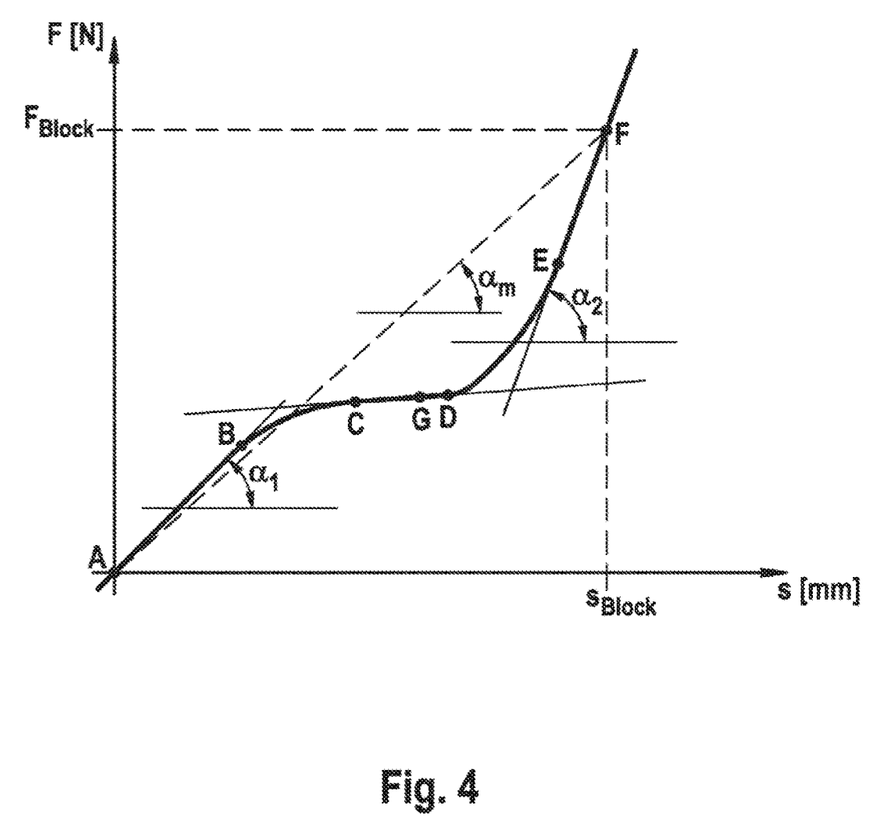
FIG. 4 shows a non-linear force-travel spring curve of a preferred embodiment of an elastic element with alternating composition according to the invention.

As shown in FIG. 3, the elastic element 22 is composed of three disc springs 48, 49, 50, and FIG. 4 shows that according to an aspect of the invention, a non-linearly expanded force-travel spring curve is defined. The force-travel spring curve of the modularly composed elastic element 22 comprises at least one degressively curved spring curve portion A-B and a progressively curved spring curve portion C-D. As an additional spreading measure, it may be provided that the force-travel spring curve of the modularly composed elastic element also has at least one spring curve portion B-C which is oriented largely horizontally. This horizontally oriented spring curve portion B-C, according to FIG. 4, is inserted between the degressively curved spring curve portion A-B and the progressively curved spring curve portion C-D.

A structural design of the elastic element 22 provides that it is present as a layered disc spring column which includes at least one individual disc spring together with a disc spring packet, arranged alternately relative to the individual disc spring, and wherein this disc spring packet comprises at least two superposed disc springs facing in the same direction. Furthermore, the exemplary disc spring packet in FIG. 3 has two identically formed disc springs with degressive spring curve, wherein the block force of the disc spring packet is designed smaller than the block force of the elastic element 22. In other words, as the force grows, firstly the disc spring packet goes to block length (the elastic deformation stops) before the individual disc spring reaches block length under correspondingly increased force In general, the individual disc spring has a linear or progressive force-travel spring curve, wherein the block force of the individual disc spring corresponds to a maximally rated block force of the elastic element 22. Accordingly, the individual disc spring serves effectively as a final stop brake which can still deform after the force increase has progressed, although the disc spring packet has already fulfilled its maximum working capacity by reaching its block length.

A correspondingly reversed matching between the rated values of the spring packet and individual disc spring is in principle conceivable, together with a sensitive electric motor current shutdown by the ECU, precisely digitally timed by means of shortened interval times of for example approximately 5 ms. For this, the disc spring packet may for example have two identically configured disc springs with a linear or progressive force-travel spring curve, wherein the individual disc spring has a degressive force-travel spring curve. Accordingly, the block force of the disc spring packet may correspond to a maximally rated block force of the elastic element 22.

As the preferred embodiment from FIG. 3 shows, all disc springs of the elastic element structurally have identical outer diameters, wherein in comparison with the disc springs of the spring packet, the individual disc spring has a larger inner diameter. A wall thickness of an individual disc spring substantially corresponds approximately to a summary wall thickness of the disc spring packet of the elastic element.

The material for the elastic element 22 is preferably spring steel. Here, it is advantageous in logistical and cost terms if all disc springs of the elastic element 22 are made from identical spring steel material.

LIST OF REFERENCE SIGNS

1 Drum brake module
2 Brake holder
3 Cable-pull actuator
4 Gearing
5 Cable-pull
6 Brake means
7 Motor
8 Gear housing
9 Spindle arrangement
10 Adapter
11 Support device
12 Outside
13 Inside
14 Drive nut
15 Bearing
16 Contact face
17 Guide
18 Sheath
19 Guide
20 Release end stop
21 Counterbearing
22 Elastic element
23 Connector
24 Passage opening
25 Outlet opening
26 Seal element
30 Gearing housing sump
31 Gearing housing cover
32 Flank
33 Hub
34 Gearwheel
35 Depression
36 Axial bearing
37 Recess
38 Bearing seat
39 Spring plate
40 Base
41 Wall
42 Passage bore
43 Front face
44 Relief
45 Ring bead protrusion
46 Ring groove depression
47 Stop cam
48 Disc spring
49 Disc spring
50 Disc spring
A2 Axis
$\alpha 1, \alpha 2$, am Gradient
B Actuation direction
Z Rotation axis
G Reversal point
ax axial
r radial
s1, sg Wall thickness
Ü Projecting length
MMI Man-machine interface
MGU Motor-gear unit
ECU Electronic control unit
M Electric motor LAN/WLAN Optional: (protected) off-board interface towards an external data network

The invention claimed is:

1. An electrical wheel brake actuator for motor vehicles, having an electric motor-gear assembly with a rotation-translation converter assembly that comprises a nut-spindle arrangement in a gear housing, wherein the wheel brake actuator is designed such that brake means can execute an actuating movement in the direction of a brake rotor, and with an elastic element which is clamped between a release end stop of the nut-spindle arrangement and the gear housing in order to allow an electric motor to be automatically electrically switched off by an electronic control unit, wherein the elastic element has at least two disc springs to form an expanded, segmented force-travel spring curve composed of multiple different spring curve portions, wherein the force-travel spring curve includes a degressively curved spring curve portion B-C and a progressively curved spring curve portion D-E,
wherein the force-travel spring curve includes a substantially linearly oriented spring curve portion C-D which has a substantially constant gradient, the spring curve portion C-D positioned between the degressively curved spring curve portion B-C and the progressively curved spring curve portion D-E, and
wherein the force-travel spring curve includes a linearly oriented spring curve portion A-B with a first substantially constant gradient a1, and a linearly oriented spring curve portion E-F with a second substantially constant gradient a2, wherein the gradient a1 of the spring curve portion A-B is less than or equal to the gradient a2 of the spring curve portion E-F.

2. The electrical wheel brake actuator for motor vehicles as claimed in claim 1, wherein the force-travel spring curve substantially has a continuous curve form, the curvature of which corresponds to an uneven function of at least the cubic order or higher order.

3. The electrical wheel brake actuator for motor vehicles as claimed in claim 1, wherein the gradient data are configured with a2 greater than or equal to a1 greater than or equal to a mean gradient.

4. The electrical wheel brake actuator for motor vehicles as claimed claim 1, wherein the force-travel spring curve, in the linearly oriented spring curve portion C-D, has a reversal point G in the curvature between the degressively curved spring curve portion B-C and the progressively curved spring curve portion D-E.

5. The electrical wheel brake actuator for motor vehicles as claimed claim 1, wherein the elastic element is present as a layered disc spring column which includes at least one individual disc spring together with a disc spring packet, and wherein the disc spring packet comprises at least two superposed disc springs facing in the same direction as each other.

6. The electrical wheel brake actuator for motor vehicles as claimed claim 5, wherein the disc spring packet has two identically formed disc springs with a degressive spring curve, wherein a block force of the disc spring packet is designed smaller than a block force of the elastic element.

7. The electrical wheel brake actuator for motor vehicles as claimed in claim 5, wherein the at least one individual disc spring contributes a linear and/or progressive spring curve portion, wherein a block force of the individual disc spring corresponds to a maximally rated block force of the elastic element.

8. The electrical wheel brake actuator for motor vehicles as claimed in claim 5, wherein the disc spring packet has two identically formed disc springs which contribute a linear and/or progressive spring curve portion.

9. The electrical wheel brake actuator for motor vehicles as claimed in claim 5, wherein a block force of the disc spring packet corresponds to a maximally rated block force of the elastic element.

10. The electrical wheel brake actuator for motor vehicles as claimed in claim 1, wherein the at least two disc springs of the elastic element have identical outer diameters, wherein one disc spring of the at least two disc springs has a larger inner diameter than another disc spring of the at least two disc springs.

11. The electrical wheel brake actuator for motor vehicles as claimed in claim 10, wherein a wall thickness s1 of the one disc spring substantially corresponds to a summary wall thickness sg of the other disc spring and wherein the at least two disc springs comprise superposed disc springs facing in the same direction.

12. The electrical wheel brake actuator for motor vehicles as claimed in claim 1, wherein all disc springs of the elastic element are formed from identical stainless spring steel material.

* * * * *

UNITED STATES PATENT AND TRADEMARK OFFICE
CERTIFICATE OF CORRECTION

PATENT NO. : 12,084,015 B2
APPLICATION NO. : 17/280428
DATED : September 10, 2024
INVENTOR(S) : Thomas Winkler and Jürgen Balz It is certified that error appears in the above-identified patent and that said Letters Patent is hereby corrected as shown below:

In the Claims

In Column 10, Claim 6, Line 13-14: delete "curve, wherein a block force of the disc spring packet is designed smaller than a block force of the elastic element" and insert -- curve. --.

Signed and Sealed this
Twenty-ninth Day of April, 2025

Coke Morgan Stewart
*Acting Director of the United States Patent and Trademark Office*